Oct. 24, 1939.　　　　E. B. GATTEN　　　　2,177,035
SNAP FOR SAMPLE OPHTHALMIC MOUNTINGS
Filed Aug. 20, 1937
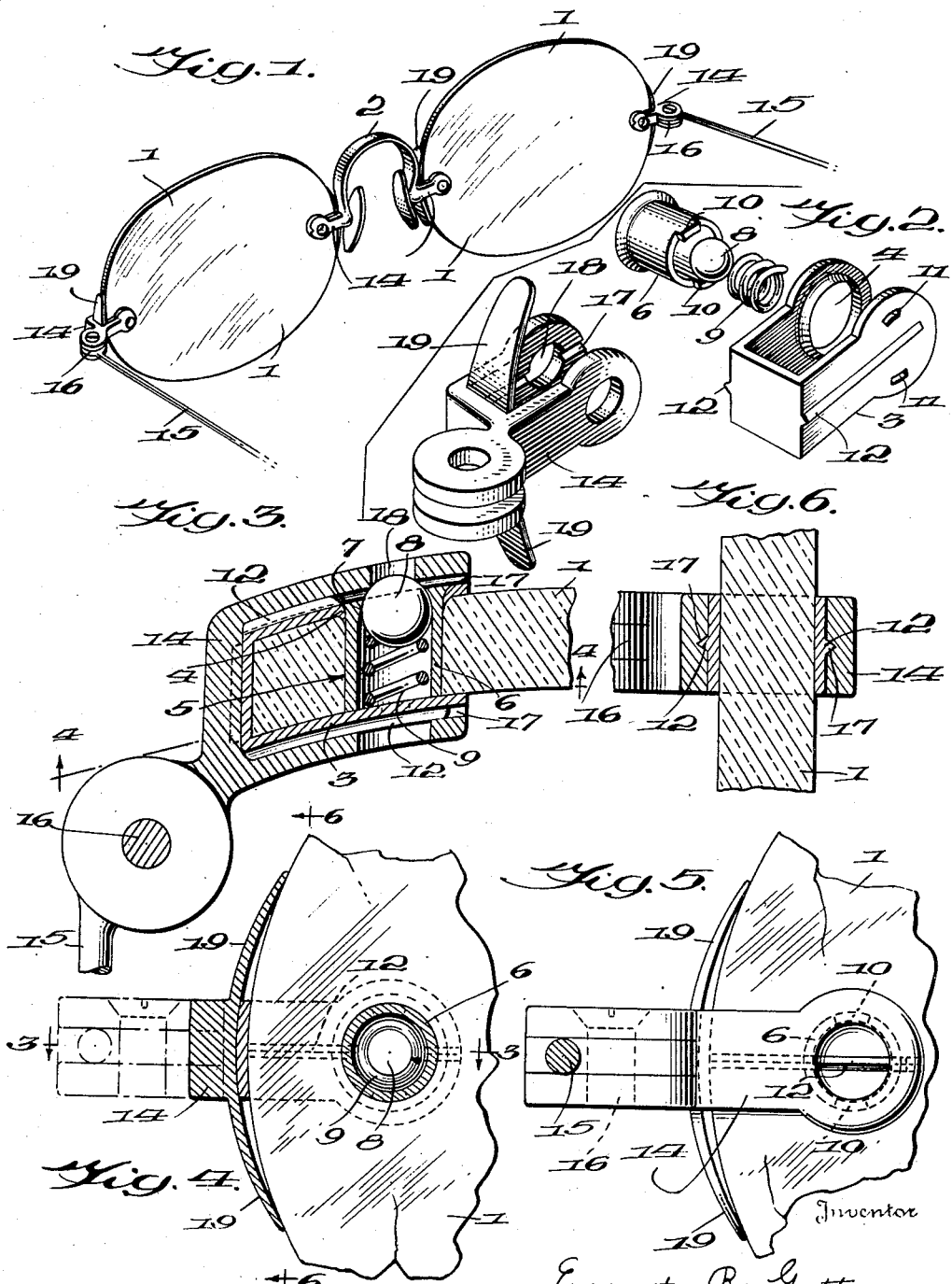
Inventor
Ernest B. Gatten
By C. A. Brandenburg
his Attorney Patented Oct. 24, 1939

2,177,035

UNITED STATES PATENT OFFICE 2,177,035

SNAP FOR SAMPLE OPHTHALMIC MOUNTINGS

Ernest B. Gatten, Richmond, Va.

Application August 20, 1937, Serial No. 160,187

6 Claims. (Cl. 88—47)

My invention relates to an improved snap for sample ophthalmic mountings.

The object is to provide sample lenses equipped with snaps, the lenses being of various patterns, such as octagon, oval and round, and in various sizes for each pattern, so that an optician can take a mounting of the right size out of his stock, snap on a pair of sample lenses of the most suitable pattern and size and be able to show his customer exactly what the finished job would look like, so that if the prospective wearer should not like the pattern of the lenses it would be but a minute's work to remove them and snap on another pair of a different pattern.

With these objects in view, this invention consists of a spring-actuated ball adapted to be held in the screw or rivet hole of a lens, a clamp embracing the edge of a lens for holding the ball in place with a portion of the latter protruding beyond the surface of the lens, and a strap removably and slidably connected with the clamp, and having a depression therein adapted to receive the ball whereby to retain the strap temporarily in place on the lens.

In the accompanying drawing:

Fig. 1 is a view in perspective;

Fig. 2 is a view of the several parts going to make up my invention detached from one another;

Fig. 3 is a section on the line 3—3 of Fig. 4;

Fig. 4 is a section on the line 4—4 of Fig. 3, looking in the direction of the arrows;

Fig. 5 is a face view looking from the wearer's eye; and

Fig. 6 is a transverse sectional view.

The numeral 1 represents lenses, and 2 is a bridge for connecting the lenses.

The numeral 3 indicates a clip or clamp fitted to and adapted to embrace the edge of the lens. This clip may be made of sheet or other metal, and is composed of three parts which embrace the opposite sides and edge of the lens, as better shown in Fig. 3. One side is provided with a hole 4 which is adapted to register with the screw or rivet hole 5 in the lens. A bushing 6 is fitted to this hole 5 and is preferably slightly flared at one end, and this flared end is reduced or constricted in size as shown at 7 to confine the ball 8 held therein. A spring 9 presses the ball into the constricted end 7, the diameter of which is less than the greatest diameter of the ball, so that a portion of the ball protrudes beyond the end of the bushing as shown in Fig. 3.

The bushing is preferably provided with lugs 10 adapted to enter holes 11 in the side of the clip opposite the opening 4, as shown in Fig. 2. The clip is provided with V-shaped guides 12 from opposite surfaces. These extend lengthwise of the clip.

The numeral 14 represents a strap and one of these extends out in opposite directions from the bridge 2 and to the outer strap the temples 15 are hinged by means of a screw 16. The straps are provided with V-shaped grooves 17 adapted to receive the guides 12 when the straps 14 are slid over the clamps 3, as shown in Figs. 3 and 6. These grooves and guides not only guide the straps in snapping them on to the lens, but also prevent them from twisting or turning.

The straps are provided with a hole or recess 18 adapted to receive the spring-actuated ball 8. The ball is pressed back against the action of the spring 9 when the strap is slid over the clamp, and when in place the ball enters the hole or recess 18 to hold the strap in place as shown in Fig. 3. The usual spring extensions 19 are adapted to rest against the edge of the lens to facilitate holding the parts in position on the lens.

By means of this improvement, much time is saved in fitting glasses to the customer, since the straps are easily and very quickly applied to, or removed from, any variety, size or style of lens the customer may want to try on and select for permanent wear.

I claim:

1. A snap for lenses including a clamp constructed to embrace a lens and having a hole therein adapted to register with a hole in the lens, a spring-actuated ball held within the hole in the lens, a strap slidably connected with the clamp and having an opening therein adapted to receive a portion of the spring actuated ball, whereby the clamp and strap are temporarily fastened together.

2. A device of the character described including a clamp constructed and adapted to embrace the edge of a lens and having an opening adapted to register with a hole in the lens, a bushing adapted to extend into the hole in the lens, a spring-actuated ball confined and movable in the bushing, the bushing having an opening of less diameter than the diameter of the ball through which a portion of the ball normally protrudes, and a strap adapted to slide over the clamp and having an opening to receive the protruding portion of the ball when the strap is in position on the clamp.

3. A device of the character described including a clamp constructed and adapted to embrace the edge of a lens and having an opening adapted to register with a hole in the lens, a bushing adapted to extend into the hole in the lens, a spring-actuated ball confined and movable in the bushing, the bushing having an opening of less diameter than the diameter of the ball through which a portion of the ball normally protrudes, a strap adapted to slide over the clamp and having an opening to receive the protruding portion of the ball when the strap is in position on the clamp, and guides and grooves between the clamp and strap for guiding said parts when they are slid together, and constituting lateral supports for the strap.

4. The combination of a lens having a hole therein, a clamp constructed and adapted to embrace an edge of the lens having an opening in position to register with the hole in the lens, a bushing adapted to enter the hole in the lens, a spring-actuated ball located within the bushing and of a diameter greater than an opening in one end thereof, the clamp having guides extending longitudinally thereof and a strap having a groove adapted to fit and receive the guides, the strap having an opening adapted to receive the protruding end of the ball when the strap is slid over the clamp, whereby the strap is removably and temporarily held upon the clamp.

5. The combination of a lens having a hole therein, a spring-pressed catch movable and confined partially at least within the hole in the lens, a clamp embracing the edge of the lens, and having a hole which registers with the hole in the lens when the clamp is in place on the lens, and a strap which embraces the lens and clamp, and which has an opening therein to receive the spring-pressed catch when the strap is in its normal position on the lens.

6. The combination of a lens having a hole therein, a bushing located in the hole in the lens and having a constricted end, a spring-pressed catch located within the bushing and partially confined by the constricted end thereof, a clamp embracing the edge of the lens, and having a hole which registers with the hole in the lens when the clamp is in place on the lens, and a strap which embraces the lens and clamp, and which has an opening therein to receive the spring-pressed catch when the strap is in its normal position on the lens.

ERNEST B. GATTEN.